(12) United States Patent
Tetsuka et al.

(10) Patent No.: US 10,151,264 B2
(45) Date of Patent: Dec. 11, 2018

(54) REMAINING FUEL AMOUNT WARNING DEVICE FOR MOTORCYCLE

(71) Applicant: HONDA MOTOR CO., LTD., Tokyo (JP)

(72) Inventors: Takashi Tetsuka, Wako (JP); Yasumasa Matsui, Wako (JP); Ryuta Niimura, Wako (JP); Shunichi Miyagishi, Wako (JP); Jun Adachi, Wako (JP); Kosuke Kuroda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/514,225

(22) PCT Filed: Sep. 11, 2015

(86) PCT No.: PCT/JP2015/075817
§ 371 (c)(1),
(2) Date: Mar. 24, 2017

(87) PCT Pub. No.: WO2016/047463
PCT Pub. Date: Mar. 31, 2016

(65) Prior Publication Data
US 2017/0306876 A1    Oct. 26, 2017

(30) Foreign Application Priority Data
Sep. 26, 2014   (JP) ................... 2014-196815

(51) Int. Cl.
*F02D 41/22*    (2006.01)
*F02D 45/00*    (2006.01)
(Continued)

(52) U.S. Cl.
CPC .......... *F02D 41/22* (2013.01); *F02D 41/0002* (2013.01); *F02D 41/021* (2013.01);
(Continued)

(58) Field of Classification Search
CPC .......... F02D 17/04; F02D 29/02; F02D 41/00; F02D 41/002; F02D 41/04; F02D 41/30;
(Continued)

(56) References Cited

U.S. PATENT DOCUMENTS

| 7,475,746 | B2   | 1/2009 | Tsukada et al.         |
|-----------|------|--------|------------------------|
| 9,371,074 | B1 * | 6/2016 | Luehrsen ...... B60W 50/02 |

(Continued)

FOREIGN PATENT DOCUMENTS

| JP | 2-149750 | 6/1990  |
|----|----------|---------|
| JP | 6-330787 | 11/1994 |

(Continued)

OTHER PUBLICATIONS

JP 2009-250045 English Translation Version.*
(Continued)

*Primary Examiner* — John Kwon
*Assistant Examiner* — Johnny H Hoang
(74) *Attorney, Agent, or Firm* — Rankin, Hill & Clark LLP

(57) ABSTRACT

A remaining fuel amount warning device for a vehicle, the remaining fuel amount warning device giving a warning that an amount of fuel remaining in a fuel tank is smaller than a predetermined value on the basis of output of a fuel gauge measuring the remaining fuel amount, includes combustion state changing device for changing the combustion state of an engine. When the remaining fuel amount becomes smaller than the predetermined value, the remaining fuel amount warning device performs remaining amount warning control that produces vibration different than during normal operation by changing the combustion state of the engine by the combustion state changing device. A starter switch for starting the engine is made to serve also as a warning acknowledging button for stopping the remaining (Continued)

amount warning control for a predetermined time on the basis of an operation by an occupant.

24 Claims, 10 Drawing Sheets

(51) Int. Cl.
- *F02D 41/00* (2006.01)
- *F02D 41/04* (2006.01)
- *F02D 41/30* (2006.01)
- *G07C 5/08* (2006.01)
- *F02D 41/02* (2006.01)

(52) U.S. Cl.
CPC ......... *F02D 41/04* (2013.01); *F02D 41/3005* (2013.01); *F02D 41/3017* (2013.01); *F02D 45/00* (2013.01); *G07C 5/0841* (2013.01); *B60Y 2200/12* (2013.01); *B60Y 2300/43* (2013.01); *B60Y 2302/03* (2013.01); *F02D 2200/06* (2013.01); *F02D 2400/00* (2013.01); *Y02T 10/40* (2013.01)

(58) Field of Classification Search
CPC .. F02D 41/3005; F02D 41/3017; F02D 41/22; F02D 41/32; F02M 37/00; F02P 11/00; G07C 5/08; G07C 5/0841
USPC .......... 123/434, 445–447, 515–525; 701/102–105, 111, 114
See application file for complete search history.

(56) References Cited

U.S. PATENT DOCUMENTS

| | | | | |
|---|---|---|---|---|
| 9,702,315 | B1* | 7/2017 | Palmer | F02D 43/00 |
| 9,745,931 | B2* | 8/2017 | McGrew | F02M 53/00 |
| 2006/0065239 | A1 | 3/2006 | Tsukada et al. | |
| 2009/0114288 | A1* | 5/2009 | Grant | F02D 19/0628 137/88 |
| 2009/0146846 | A1* | 6/2009 | Grossman | B60R 25/04 340/988 |
| 2010/0211289 | A1* | 8/2010 | Yoshida | G01N 33/2829 701/103 |
| 2016/0243931 | A1* | 8/2016 | Dudar | F02D 41/003 |

FOREIGN PATENT DOCUMENTS

| | | |
|---|---|---|
| JP | 8-93615 | 4/1996 |
| JP | H09-240321 A | 9/1997 |
| JP | 2006-104953 | 4/2006 |
| JP | 2009-250045 | 10/2009 |
| JP | 2010-024895 A | 2/2010 |
| JP | 2010-32279 | 2/2010 |
| JP | 2013-053587 | 3/2013 |
| JP | 2013-121790 | 6/2013 |
| JP | 2014-024373 | 2/2014 |
| KR | 100771822 B1 | 10/2007 |

OTHER PUBLICATIONS

JP 2013-121790 English Translation Version.*
Japanese Office Action dated Oct. 4, 2017, English translation included, 10 pages.
Translation of the PCT International Preliminary Report on Patentability dated Mar. 30, 2017, 12 pages.
Japanese Office Action with English Translation dated Jul. 11, 2018, 9 pages.
Japanese Notice of Rejection with English translation dated Mar. 14, 2018, 10 pages.
European Search Report dated Jun. 11, 2018, 11 pages.

* cited by examiner

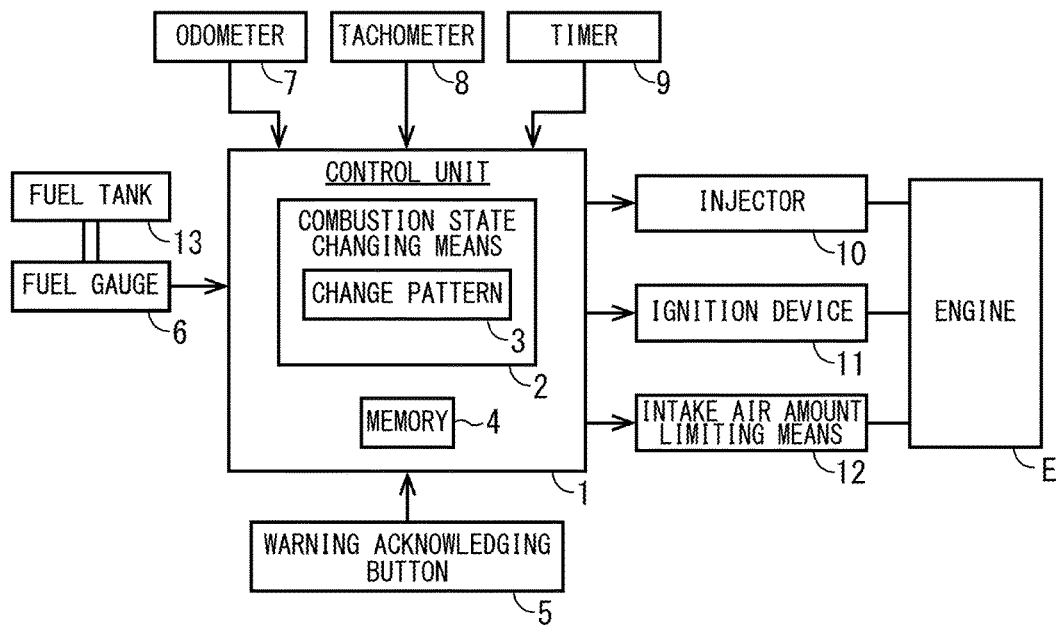

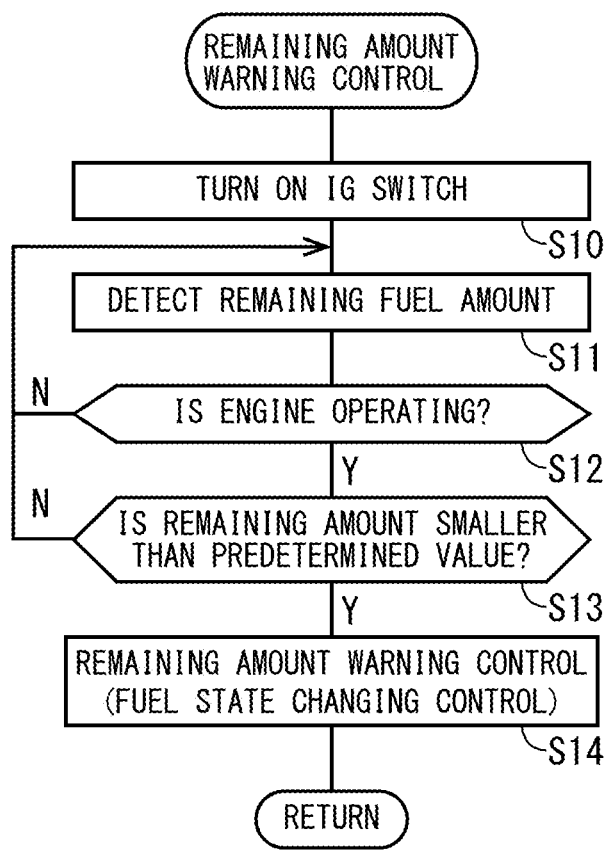

Fig.6

→ FUEL INJECTION ORDER

| CYLINDER | #1 | #2 | #4 | #3 | #1 | #2 | #4 | #3 | #1 | #2 | #4 | ..... |

… 1

REMAINING FUEL AMOUNT WARNING DEVICE FOR MOTORCYCLE

TECHNICAL FIELD

The present invention relates to a remaining fuel amount warning device for a motorcycle, and particularly to a remaining fuel amount warning device for a motorcycle which warning device provides a warning that an amount of remaining fuel has become smaller than a predetermined value.

BACKGROUND ART

A conventional structure is known in which a fuel gauge displaying an amount of fuel remaining within a fuel tank is provided to a vehicle and a warning is provided by an indicator or the like when the remaining fuel amount has become smaller than a predetermined value.

Patent Literature 1 discloses a remaining fuel amount warning device in which consideration is given to suppression of an increase in cost.

CITATION LIST

Patent Literature

Patent Document 1: JP 2010-32279 A

SUMMARY OF INVENTION

Technical Problem

However, depending on a vehicle type, an indicator (light source) cannot be provided because of cost or the like. Thus, there has been a desire to give a warning to a driver without using a light source. In addition, there is a desire to give a more intuitive warning to a driver even when a light source is used.

It is an object of the present invention to solve problems of the above-described conventional technology, and provide a remaining fuel amount warning device for a motorcycle which warning device enables an intuitive recognition that an amount of remaining fuel is smaller than a predetermined value.

To achieve the afore-mentioned object, the present invention has a first feature in a remaining fuel amount warning device for a motorcycle, the remaining fuel amount warning device giving a warning that an amount of fuel remaining in a fuel tank (13) is smaller than a predetermined value on a basis of output of a fuel gauge (6) measuring the remaining fuel amount, the remaining fuel amount warning device comprising: combustion state changing means (2) for changing a combustion state of an engine (E); when the remaining fuel amount becomes smaller than the predetermined value, the remaining fuel amount warning device performing remaining amount warning control that produces vibration different than during normal operation by changing the combustion state of the engine (E) by the combustion state changing means (2); further comprising warning acknowledging means (5) for stopping the remaining amount warning control for a predetermined time on a basis of an operation by an occupant; an operating switch for operating another device provided to the vehicle is made to serve also as the warning acknowledging means (5); and the operating switch is a starter switch for starting the engine (E).

The present invention has a second feature in a remaining fuel amount warning device for a motorcycle, the remaining fuel amount warning device giving a warning that an amount of fuel remaining in a fuel tank (13) is smaller than a predetermined value on a basis of output of a fuel gauge (6) measuring the remaining fuel amount, the remaining fuel amount warning device comprising: combustion state changing means (2) for changing a combustion state of an engine (E); when the remaining fuel amount becomes smaller than the predetermined value, the remaining fuel amount warning device performing remaining amount warning control that produces vibration different than during normal operation by changing the combustion state of the engine (E) by the combustion state changing means (2); further comprising warning acknowledging means (5) for stopping the remaining amount warning control for a predetermined time on a basis of an operation by an occupant; an operating switch for operating another device provided to the vehicle is made to serve also as the warning acknowledging means (5); and the operating switch is a cancellation switch for stopping perform of a winker.

The present invention has a third feature in that the remaining amount warning control is periodically performed at each predetermined interval.

The present invention has a fourth feature in that the remaining amount warning control is set to change the predetermined interval according to a change in the remaining fuel amount, an amount of fuel consumption, a traveled distance, an elapsed time, or the like, the change occurring as the vehicle travels.

The present invention has a fifth feature in that the remaining amount warning control is set to change magnitude of the vibration according to a change in the remaining fuel amount, an amount of fuel consumption, a traveled distance, an elapsed time, or the like, the change occurring as the vehicle travels.

The present invention has a sixth feature in that the remaining amount warning control is performed by changing an amount of fuel injection by an injector (10) that supplies the fuel to the engine (E).

The present invention has a seventh feature in that the fuel injection amount is changed by injection thinning out, the injection thinning out limiting a predetermined number of consecutive times of injection in injection timings occurring in one cycle, and the predetermined number of consecutive times is increased according to a number of cylinders of the engine (E).

The present invention has an eighth feature in that the predetermined number of consecutive times is a number of times equal to or higher than a value calculated by a calculation equation, the number of cylinders (X) of the engine (E)÷2.

The present invention has a ninth feature in that the remaining amount warning control is performed by changing a driving mode of an ignition device (11) of the engine (E).

The present invention has a tenth feature in that the remaining amount warning control is performed by limiting an amount of intake air to the engine (E).

The present invention has a eleventh feature in that the combustion state changing means (2) is configured to perform also vehicle speed limiting control by changing the combustion state of the engine (E), and the vibration generated by the remaining amount warning control is different from vibration generated by the vehicle speed limiting control.

The present invention has a twelfth feature in that the remaining amount warning control is not performed in a state in which rotational speed of the engine (E) is less than a predetermined value.

The present invention has a thirteenth feature in that the remaining amount warning control is not performed in a state in which vehicle speed is less than a predetermined value.

The present invention has a fourteenth feature in further comprising a memory (4) configured to retain a performance history of the remaining amount warning control also after a stop of the engine (E), wherein when there is no increase in the remaining fuel amount at a time of a restart of the engine (E), the remaining amount warning control is resumed from a time of the stop of the engine (E) on a basis of the performance history.

Advantageous Effects of Invention

According to the first feature, a remaining fuel amount warning device for a motorcycle comprises combustion state changing means (2) for changing a combustion state of an engine (E) and when the remaining fuel amount becomes smaller than the predetermined value, the remaining fuel amount warning device performs remaining amount warning control that produces vibration different than during normal operation by changing the combustion state of the engine (E) by the combustion state changing means (2); further comprising warning acknowledging means (5) for stopping the remaining amount warning control for a predetermined time on a basis of an operation by an occupant; an operating switch for operating another device provided to the vehicle is made to serve also as the warning acknowledging means (5); and the operating switch is a starter switch for starting the engine (E). Therefore, when the combustion state of the engine is changed, vibrations different than during the normal operation are generated in the engine and the vehicle body, so that the occupant can be made to recognize that the remaining fuel amount is decreasing. It is thereby possible to warn of a decrease in the remaining fuel amount effectively even while the vehicle is traveling, without adding a dedicated device for warning of the decrease in the remaining fuel amount. Also, because the remaining amount warning control can be temporarily stopped according to an intention of the occupant, the usability of the remaining fuel amount warning device can be improved. In addition, it is possible to reduce the number of parts without a need for the addition of a new part for the warning acknowledging means. Furthermore, the warning acknowledging means is formed by making effective use of a starter switch not used during traveling after a start of the engine. Thus, the number of parts and cost can be reduced.

According to the second feature, a remaining fuel amount warning device for a motorcycle comprises combustion state changing means (2) for changing a combustion state of an engine (E) and when the remaining fuel amount becomes smaller than the predetermined value, the remaining fuel amount warning device performs remaining amount warning control that produces vibration different than during normal operation by changing the combustion state of the engine (E) by the combustion state changing means (2); further comprising warning acknowledging means (5) for stopping the remaining amount warning control for a predetermined time on a basis of an operation by an occupant; an operating switch for operating another device provided to the vehicle is made to serve also as the warning acknowledging means (5); and the operating switch is a starter switch for starting the engine (E). Therefore, the warning acknowledging means is formed by making effective use of a cancellation switch not used during un-operating of a winker. Thus, the number of parts and cost can be reduced.

According to the third feature, the remaining amount warning control is periodically performed at each predetermined interval. Therefore, the occupant can be made to recognize that the vibration generated by the remaining amount warning control is produced by intentional control due to a decrease in the remaining fuel amount rather than a mechanical problem or the like.

According to the fourth feature, the remaining amount warning control is set to change the predetermined interval according to a change in the remaining fuel amount, an amount of fuel consumption, a traveled distance, an elapsed time, or the like, the change occurring as the vehicle travels. Therefore, an effect of prompting the occupant to perform refueling is enhanced by for example making a setting such that the predetermined interval is shortened according to an amount of fuel used after a start of a remaining amount warning.

According to the fifth feature, the remaining amount warning control is set to change magnitude of the vibration according to a change in the remaining fuel amount, an amount of fuel consumption, a traveled distance, an elapsed time, or the like, the change occurring as the vehicle travels. Therefore, the effect of prompting the occupant to perform refueling is enhanced by for example making a setting such that the vibration becomes larger according to the amount of fuel used after the start of the remaining amount warning.

According to the sixth feature, the remaining amount warning control is performed by changing an amount of fuel injection by an injector (10) that supplies the fuel to the engine (E). Therefore, the remaining amount warning control is performed by changing a driving mode of electronically controlled fuel injection (for example injection amount reduction, injection thinning out, or injection timing delay). It is therefore possible to set the magnitude of the vibration or the like finely.

According to the seventh feature, the fuel injection amount is changed by injection thinning out, the injection thinning out limiting a predetermined number of consecutive times of injection in injection timings occurring in one cycle, and the predetermined number of consecutive times is increased according to a number of cylinders of the engine (E). Therefore, effective remaining amount warning control can be performed according to the number of cylinders of the engine.

According to the eighth feature, the predetermined number of consecutive times is a number of times equal to or higher than a value calculated by a calculation equation, the number of cylinders (X) of the engine (E)÷2. Therefore, it is possible to obtain an effective vibration generating effect according to the number of cylinders.

According to the ninth feature, the remaining amount warning control is performed by changing a driving mode of an ignition device (11) of the engine (E). Therefore, the remaining amount warning control is performed by changing the driving mode of the electronically controlled ignition device (for example ignition timing, ignition cutoffs, or delay control). It is therefore possible to set the magnitude of the vibration or the like finely.

According to the tenth feature, the remaining amount warning control is performed by limiting an amount of intake air to the engine (E). Therefore, the remaining amount warning control is performed by changing the driving mode of the electronically controlled ignition device. It is therefore possible to set the magnitude of the vibration or the like finely.

According to the eleventh feature, the combustion state changing means (2) is configured to perform also vehicle speed limiting control by changing the combustion state of the engine (E), and the vibration generated by the remaining amount warning control is different from vibration generated by the vehicle speed limiting control. Therefore, it is possible to make a clear difference between the remaining amount warning control and the vehicle speed limiting control, and prevent a misapprehension that the remaining fuel amount has become smaller than a predetermined value on the basis of the vibration produced by the vehicle speed limiting control, for example.

According to the twelfth feature, the remaining amount warning control is not performed in a state in which rotational speed of the engine (E) is less than a predetermined value. Therefore, it is possible to avoid engine stalling during idling operation, and make a setting so as not to give a remaining amount warning during a period during which the occupant recognizes a decreased state of the remaining fuel amount and is driving while maintaining a low rotational speed.

According to the thirteenth feature, the remaining amount warning control is not performed in a state in which vehicle speed is less than a predetermined value. Therefore, it is possible to make a setting so as not to give a remaining amount warning when the vehicle is stopped or the occupant is walking while pushing the vehicle, for example.

According to the fourteenth feature, the remaining fuel amount warning device for a motorcycle further comprises a memory (4) configured to retain a performance history of the remaining amount warning control also after a stop of the engine (E), wherein when there is no increase in the remaining fuel amount at a time of a restart of the engine (E), the remaining amount warning control is resumed from a time of the stop of the engine (E) on a basis of the performance history. Therefore, in a case where the remaining amount warning control is performed using a change pattern that shortens a cycle of occurrence of the vibration according to an elapsed time since a start of the remaining amount warning control, for example, the remaining amount warning control can be resumed by continuing to apply the cycle of occurrence of the vibration which cycle was shortened before a previous engine stop. It is thereby possible to warn the occupant of a need for refueling more effectively.

BRIEF DESCRIPTION OF DRAWINGS

FIG. 1 is a block diagram showing a general configuration of a remaining fuel amount warning device for a vehicle according to one embodiment of the present invention.

FIG. 2 is a table of methods for specifically changing the combustion state.

FIG. 3 is a flowchart showing a procedure for the remaining amount warning control.

FIG. 6 is a diagram showing fuel injection cycles of a plurality of cylinders.

DESCRIPTION OF EMBODIMENTS

Figure 4:
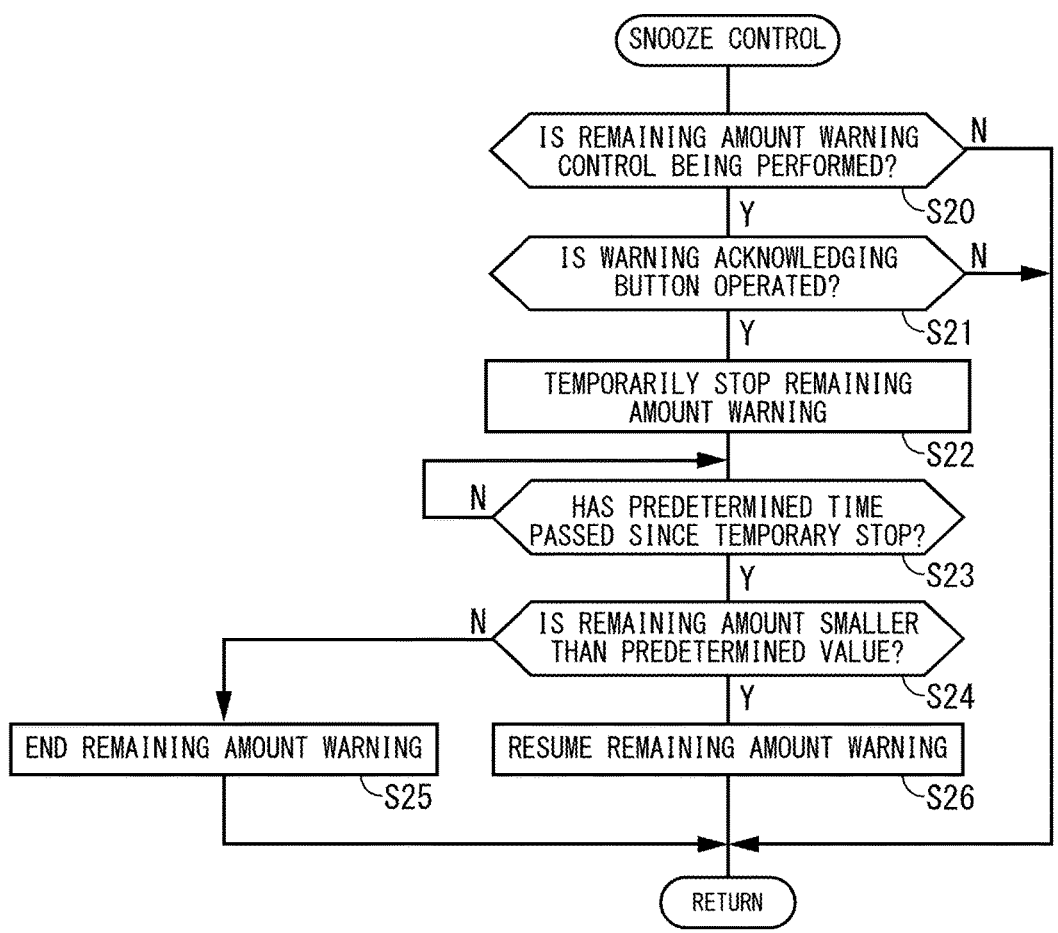
FIG. 4 is a flowchart showing a procedure for snooze control.

A preferred embodiment of the present invention will hereinafter be described in detail with reference to the drawings. FIG. 1 is a block diagram showing a general configuration of a remaining fuel amount warning device for a vehicle according to one embodiment of the present invention. A control unit 1 is an engine control unit (ECU) that controls the combustion state of an engine E as a power source of the vehicle. During normal operation of the engine E, the control unit 1 controls an injector 10 of a fuel injection device, an ignition device 11, and intake air amount limiting means 12 mainly on the basis of information about a degree of opening of a throttle device operated by an occupant, engine speed, and vehicle speed.

The control unit 1 according to the present embodiment includes combustion state changing means 2 for making the combustion state of the engine E different than during the normal operation to warn the occupant that an amount of fuel remaining in a fuel tank 13 is smaller than a predetermined value when the amount of fuel remaining in the fuel tank 13 has become smaller than the predetermined value. Remaining amount warning control performed by the combustion state changing means 2 makes the engine E and a vehicle body produce vibrations different than during the normal operation by making the combustion state of the engine E different than during the normal operation. The occupant can intuitively recognize through a tactile sense that the remaining fuel amount is smaller than the predetermined value on the basis of the vibrations different than during the normal operation.

In order to perform the remaining amount warning control, the control unit 1 is supplied with information of not only a fuel gauge 6 of the fuel tank 13 but also an odometer 7 detecting a distance traveled by the vehicle, a tachometer 8 detecting the rotational speed of the engine E, and a timer 9 detecting an elapsed time. In addition, the combustion state changing means 2 stores a plurality of change patterns 3 storing modes of occurrence of vibrations produced by the remaining amount warning control. The control unit 1 is provided with a memory 4 that can store a performance history of the change patterns 3. Further, the control unit 1 is connected with a warning acknowledging button 5 as warning acknowledging means, the warning acknowledging button 5 temporarily stopping the occurrence of the vibrations produced by the remaining fuel amount control in response to an operation by the occupant.

FIG. 2 is a table of methods for specifically changing the combustion state. The remaining amount warning control can be performed by using any of the injector 10, the ignition device 11, and the intake air amount limiting means 12. When the injector 10 is used, the engine E can be made to generate a vibration different than during the normal operation by "injection amount limitation," which shortens one injection time, "injection thinning out," which inhibits injections in predetermined injection timing, or "injection delay," which delays injection timing.

In addition, when the ignition device 11 is used, there is "ignition cutoff" that inhibits ignition of a spark plug in predetermined ignition timing or "retard control" that retards ignition timing.

Further, when the intake air amount limiting means 12 is used, there is "intake pipe passage narrowing" that drives a throttle valve disposed in an intake pipe in a closing direction, "air cleaner passage change" that increases intake air resistance by driving a valve or the like disposed within an air cleaner, or "bypass air blocking" that blocks a bypass air passage provided to the intake pipe.

It is to be noted that the methods of changing the combustion state are not limited to the methods described above, and that the remaining amount warning control can also be performed by arbitrarily combining the driving of the injector 10, the ignition device 11, and the intake air amount limiting means 12.

FIG. 3 is a flowchart showing a procedure for the remaining amount warning control. When an IG switch (ignition switch) that turns on and off power to the vehicle is turned on in step S10, a remaining amount of fuel is detected on the basis of output of the fuel gauge 6 in step S11.

In next step S12, whether or not the engine E is operating is determined. When an affirmative determination is made in step S12, the processing proceeds to step S13. Whether or not the remaining fuel amount is smaller than a predetermined value (for example smaller than 3 liters) is determined in step S13. Then, when an affirmative is obtained in step S13, the remaining amount warning control is performed in step S14, the remaining amount warning control changing the combustion state of the engine E to generate vibrations different than during the normal operation. The control sequence is then ended. When a negative determination is made in steps S12 and S13, the processing returns to step S11. That is, the remaining amount warning control shown in this flowchart is performed even during a stop or during traveling when the engine E is being started and the remaining fuel amount is smaller than the predetermined value.

FIG. 4 is a flowchart showing a procedure for snooze control. The remaining fuel amount warning device according to the present embodiment improves usability by allowing the occupant to temporarily stop the remaining amount warning control arbitrarily, and is set to give a warning again automatically when a predetermined time has passed since the temporary stop.

In step S20, whether or not the remaining amount warning control is being performed is determined. When an affirmative determination is made in step S20, the processing proceeds to step S21. Whether or not the warning acknowledging button 5 is operated is determined in step S21. When an affirmative determination is made in step S21, the processing proceeds to step S22, where the remaining amount warning control is stopped temporarily. With this temporary stop, measurement of time by the timer 9 is started.

Here, when a starter switch used at a time of starting the engine E is made to serve also as the warning acknowledging button 5, the warning acknowledging means can be formed by making effective use of the switch not used during traveling. It is therefore possible to achieve reductions in the number of parts and cost. Incidentally, a switch for another device such as a winker cancellation switch may be made to serve also as the warning acknowledging button.

In next step S23, whether or not a predetermined time has passed since the temporary stop of the remaining amount warning control is determined. When an affirmative determination is made in step S23, the processing proceeds to step S24. Whether or not the remaining fuel amount is smaller than the predetermined value is determined in step S24. When an affirmative determination is made in step S24, the processing proceeds to step S26, where the remaining amount warning is resumed to prompt again the occupant to perform refueling.

On the other hand, when a negative determination is made in step S24, that is, when the remaining fuel amount is equal to or larger than the predetermined value because the occupant has performed refueling after temporarily stopping the remaining amount warning control arbitrarily, the processing proceeds to step S25, where the remaining amount warning is directly ended. The control sequence is then ended.

Figure 5:
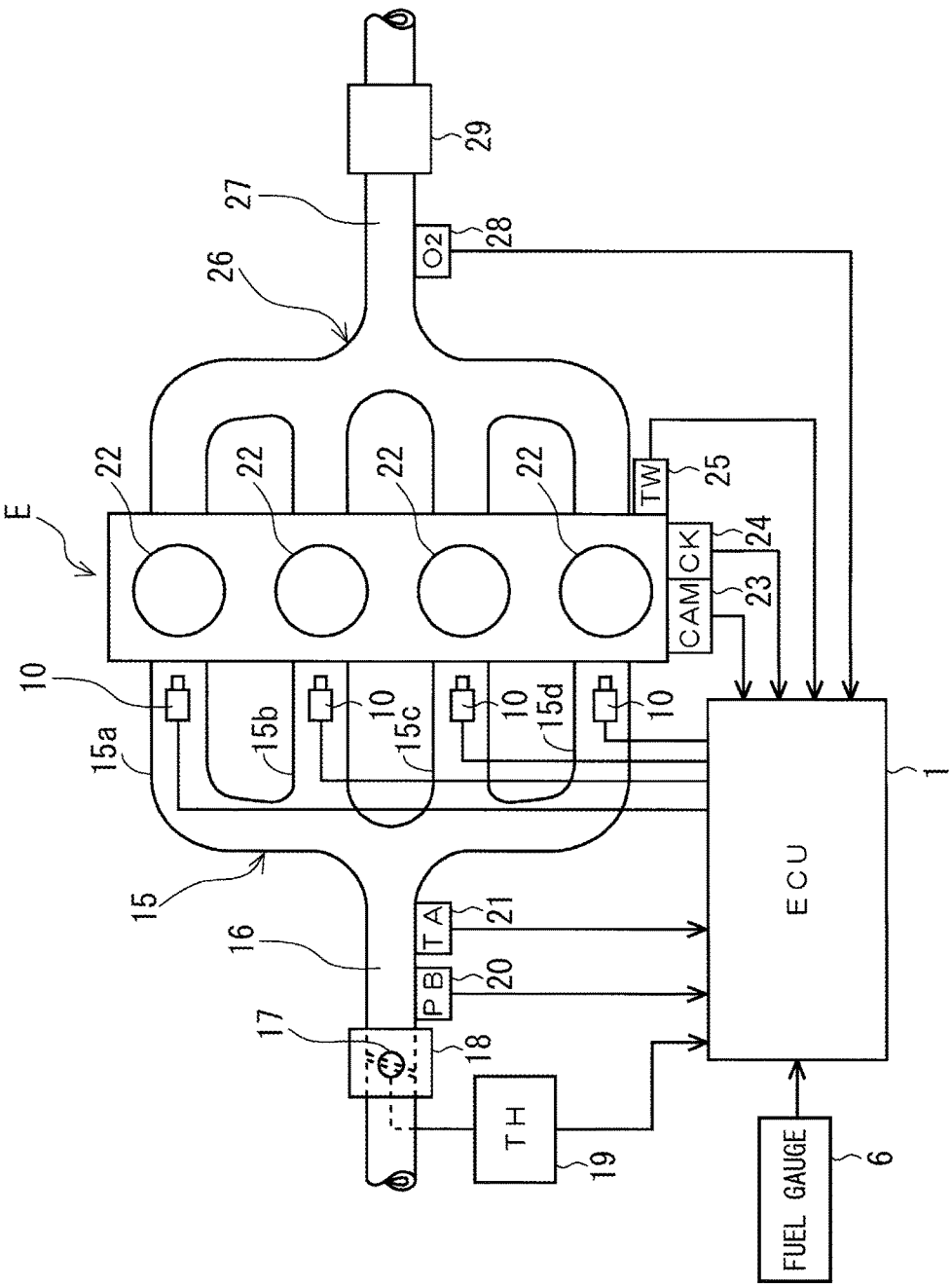
FIG. 5 is a diagram of a system configuration of principal parts of a four-cycle four-cylinder gasoline engine for a motorcycle.

FIG. 5 is a diagram of a system configuration of principal parts of a four-cycle four-cylinder gasoline engine for a motorcycle. The following description will be made of a procedure for performing the remaining amount warning control (combustion state changing control) by using the injector 10 among the injector 10, the ignition device 11, and the intake air amount limiting means 12 described above.

The engine E includes four cylinders 22. An intake manifold (intake pipe) 15 and an exhaust manifold 26 are connected to each of the cylinders 22. Each of branch pipes 15a, 15b, 15c, and 15d of the intake manifold 15 is provided with a fuel injection valve (injector) 10. A collecting pipe 16 of the intake manifold 15 is provided with a throttle body 18 having a throttle valve 17. A throttle sensor 19 that detects a degree of throttle opening θTH is connected to the throttle valve 17.

A negative pressure sensor 20 and an intake air temperature sensor 21 are attached to a pipe wall of the collecting pipe 16. On the other hand, a collecting pipe 27 of the exhaust manifold 26 is provided with an oxygen concentration sensor 28. A three-way catalyst 29 is disposed downstream of the oxygen concentration sensor 28. The three-way catalyst 29 purifies exhaust gas of HC, CO, NOx, and the like.

The engine E is provided with a crank angle sensor 24, a cam angle sensor 23, and an engine temperature sensor 25. The crank angle sensor 24 is provided for a crankshaft not shown in the figures. The crank angle sensor 24 outputs a crank pulse at intervals of a predetermined crank angle. The cam angle sensor 23 is provided for a camshaft that opens and closes an intake valve or an exhaust valve not shown in the figures. The cam angle sensor 23 is set to output a cam pulse at a compression top dead center of a particular cylinder among the four cylinders. The compression top dead centers of the other cylinders are determined on the basis of relative crank angles between the cylinders. The engine temperature sensor 25 is provided to a water jacket wall of the engine E. The engine temperature sensor 25 outputs a cooling water temperature detection signal.

The output signals of the respective sensors described above are input to an ECU 1 including a microcomputer. The output signals are not only used for control of a fuel injection amount and fuel injection timing but also used for ignition timing control and the like. The ECU 1 performs not only ordinary fuel injection control and ignition timing control but also the combustion state changing control (remaining amount warning control) according to the present invention and vehicle speed limiting control.

The remaining amount warning control according to the present embodiment stops fuel injection to the four cylinders at a predetermined ratio and thereby makes the engine E generate a vibration to warn the occupant through the tactile sense when the remaining fuel amount has become smaller than the predetermined value. On the other hand, the vehicle speed limiting control stops fuel injection to the four cylinders at a predetermined ratio, thereby decreases engine output, and thus limits the vehicle speed to a predetermined highest speed or lower, when the vehicle speed exceeds a speed limit value set in advance.

In this case, settings are made such that a mode of fuel injection is made to differ and thus the generated vibration is made to differ between the remaining amount warning control and the vehicle speed limiting control. This for example prevents a misapprehension that the remaining fuel amount is smaller than the predetermined value on the basis of the vibrations produced by the vehicle speed limiting control. In addition, a difference between the remaining amount warning control and the vehicle speed limiting control may be made clearer by allowing acceleration according to a throttle operation while giving a warning by the vibrations in the remaining amount warning control.

FIG. 6 is a diagram showing fuel injection cycles of a plurality of cylinders. In FIG. 6, #1 to #4 are cylinder identification codes. As shown in the figure, when the remaining fuel amount is equal to or larger than the predetermined value, fuel is injected into all of the cylinders in order of #1, #2, #4, and #3, and repetition in this order is maintained. Then, when the remaining fuel amount has become smaller than the predetermined value, the fuel injections performed in this cycle are stopped at a predetermined ratio (fuel cutoffs).

Figure 7:
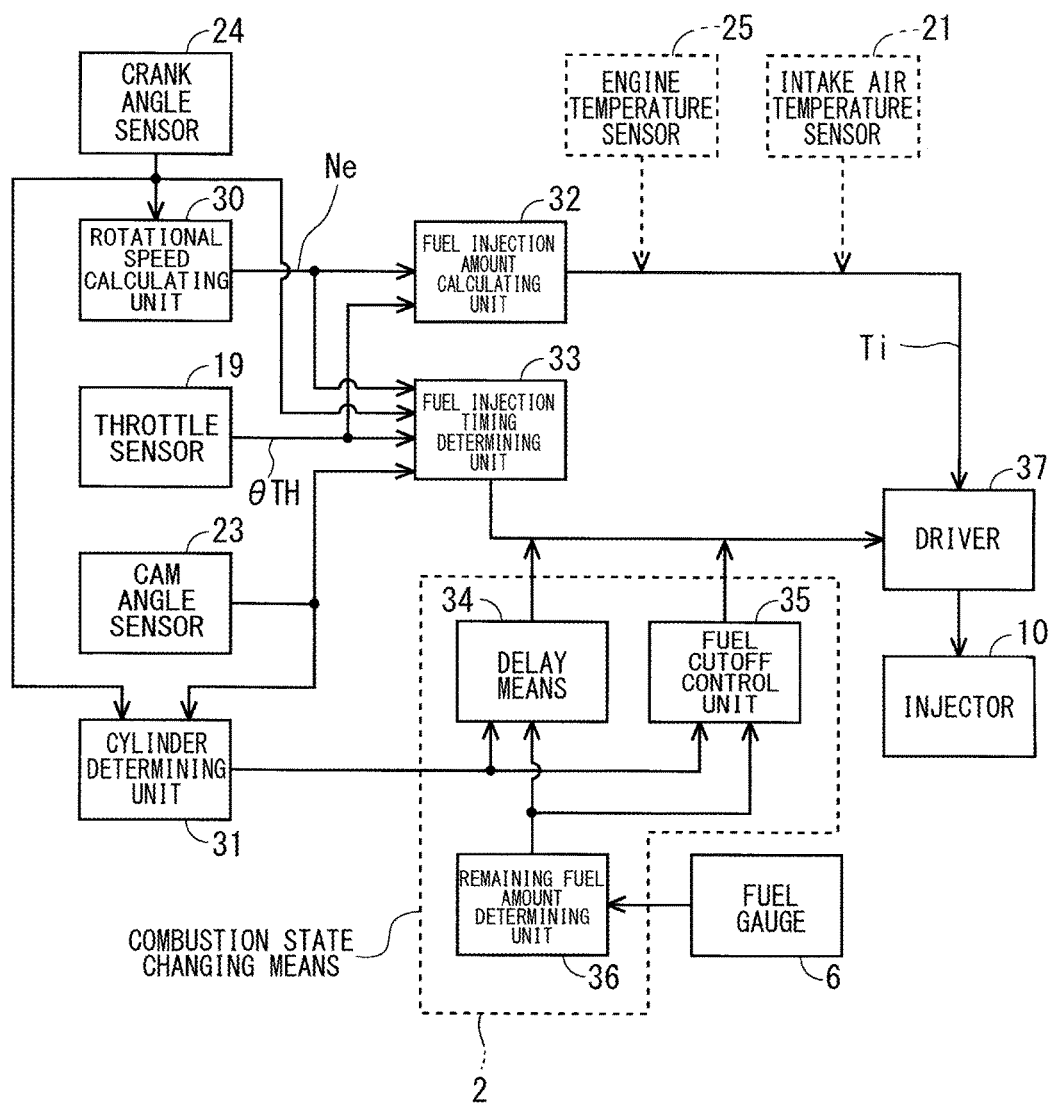
FIG. 7 is a block diagram showing functions of principal parts of the ECU.

FIG. 7 is a block diagram showing functions of principal parts of the ECU 1, and is common to the cylinders #1 to #4. A rotational speed calculating unit 30 calculates an engine speed Ne on the basis of a cycle of a crank pulse output from the crank angle sensor 24. A fuel injection amount calculating unit 32 calculates a fuel injection amount represented by a fuel injection time Ti on the basis of the engine speed Ne and the degree of throttle opening θTH that is detected by the throttle sensor 19. The fuel injection amount can be calculated by a well-known method such as the use of a map showing relation of the fuel injection time Ti to the engine speed Ne and the degree of throttle opening θTH, the use of a predetermined calculation equation. The fuel injection time Ti can be corrected on the basis of an engine temperature detected by the engine temperature sensor 25, an intake air temperature detected by the intake air temperature sensor 21, and the like.

A fuel injection timing determining unit 33 determines fuel injection start timing on the basis of the engine speed Ne and the degree of throttle opening θTH. The fuel injection timing can also be corrected on the basis of a parameter, for example the engine temperature or the like, other than the engine speed Ne and the degree of throttle opening θTH.

A crank pulse and a cam pulse are input from the crank angle sensor 24 and the cam angle sensor 23 to the fuel injection timing determining unit 33. A fuel injection command is output when the crank angle of each cylinder calculated on the basis of these input signals coincides with the fuel injection timing. When the fuel injection command is input to a driver 37, the driver 37 makes fuel injected by feeding a current to the injector 10 during only the fuel injection time Ti.

Further provided for the remaining amount warning control in the present embodiment are: a fuel cutoff control unit 35 that stops the fuel injection command output from the fuel injection timing determining unit 33; delay means 34 for delaying the fuel injection timing; and a cylinder determining unit 31 that detects a cylinder as an object for a fuel cutoff and fuel injection timing delay.

The remaining fuel amount determining unit 36 inputs a remaining fuel amount detection signal to the fuel cutoff control unit 35 and the delay means 34 on the basis of the output of the fuel gauge 6 when the remaining fuel amount has become smaller than the predetermined value. A cylinder determining unit 31 performs cylinder determination on the basis of the cam pulse and the crank pulse. The fuel cutoff control unit 35 determines a cylinder as a fuel cutoff object determined in advance on the basis of a cylinder determination signal from the cylinder determining unit 31, and outputs a fuel cutoff command. The delay means 34 determines a cylinder whose fuel injection timing is intended to be delayed on the basis of the cylinder determination signal, and outputs a delay command.

When the fuel cutoff command is output, the fuel injection command is stopped, and is not input to the driver 37 of the injector 10. In addition, when the delay command is output, the fuel injection command is delayed, and then input to the driver 37.

Figure 8:
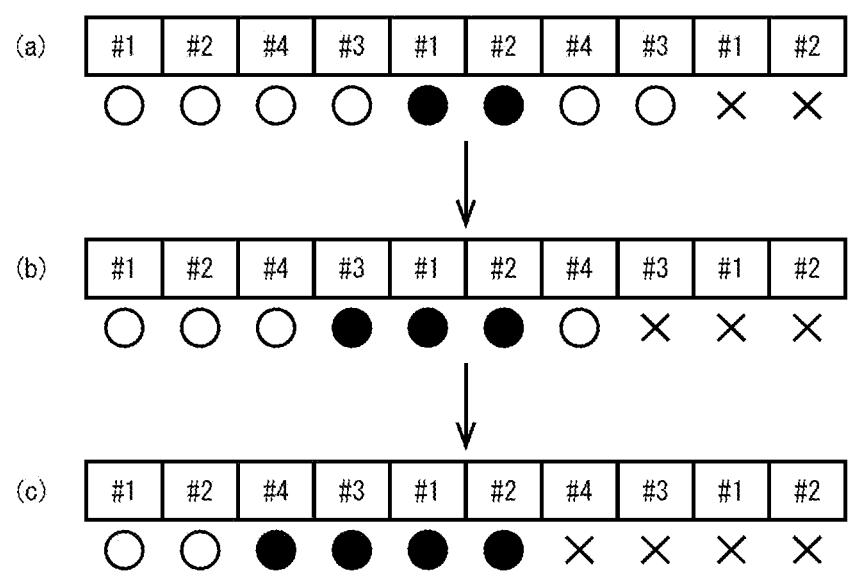
FIG. 8 is a diagram showing an example of increasing a fuel cutoff ratio stepwise.

FIG. 8 is a diagram showing an example of increasing a fuel cutoff ratio stepwise. In each figure, a white circle (○) denotes a normal injection, a black circle (•) denotes a delayed injection, and a cross symbol (x) denotes an injection cutoff. Further, (a) represents a case where a fuel cutoff is performed twice in 10 fuel injection operations, (b) represents a case where a fuel cutoff is performed three times in 10 fuel injection operations, and (c) represents a case where a fuel cutoff is performed four times in 10 fuel injection operations.

As shown in the figures, in the case of the each fuel cutoffs (x) in each of (a) to (c), at least immediately previous one-time fuel injection to the corresponding cylinder is the delayed injection (•) whose injection timing is delayed, and control is thus performed to reduce an amount of fuel sticking to a wall surface of an intake pipe. This can prevent a small amount of fuel adhering to and remaining in the intake pipe during a previous fuel injection from flowing into a combustion chamber and causing an unburned gas in a cycle during a fuel cutoff.

In the case of the remaining amount warning control by injection cutoffs, changes in rotational speed of the engine become larger as the number of fuel cutoffs is increased from (a) to (b) to (c). Thus, a vibration occurring in the engine E accordingly becomes larger, so that the occupant can be more strongly prompted to perform refueling. The combustion state changing means 2 according to the present embodiment can thus change the magnitude of the vibration arbitrarily. The combustion state changing means 2 can therefore be for example set to increase the magnitude of the vibration gradually according to a change in the remaining fuel amount, an amount of fuel consumption, a traveled distance, an elapsed time, or the like, which change occurs as the vehicle travels. Hence, an effect of prompting for refueling can be enhanced.

It is to be noted that while an example of a four-cylinder engine has been illustrated in the above description, the remaining amount warning control by fuel cutoffs can be performed irrespective of the number of cylinders of the engine. For example, in a case where the remaining amount warning control is performed by the injection thinning out, which limits a predetermined number of consecutive times of injection in injection timings occurring within one cycle, the remaining amount warning control corresponding to the number of cylinders can be performed by increasing the predetermined number of consecutive times according to the number of cylinders of the engine.

In addition, an effective vibration generating effect is obtained by performing the injection thinning out described above a number of consecutive times which number is equal to or higher than a value calculated by a calculation equation, Number of Cylinders X÷2. For example, it is desirable to perform the injection thinning out two consecutive times or more in cases of three-cylinder and four-cylinder engines, three consecutive times or more in cases of five-cylinder and six-cylinder engines, and four consecutive times or more in cases of seven-cylinder and eight-cylinder engines.

Figure 9:
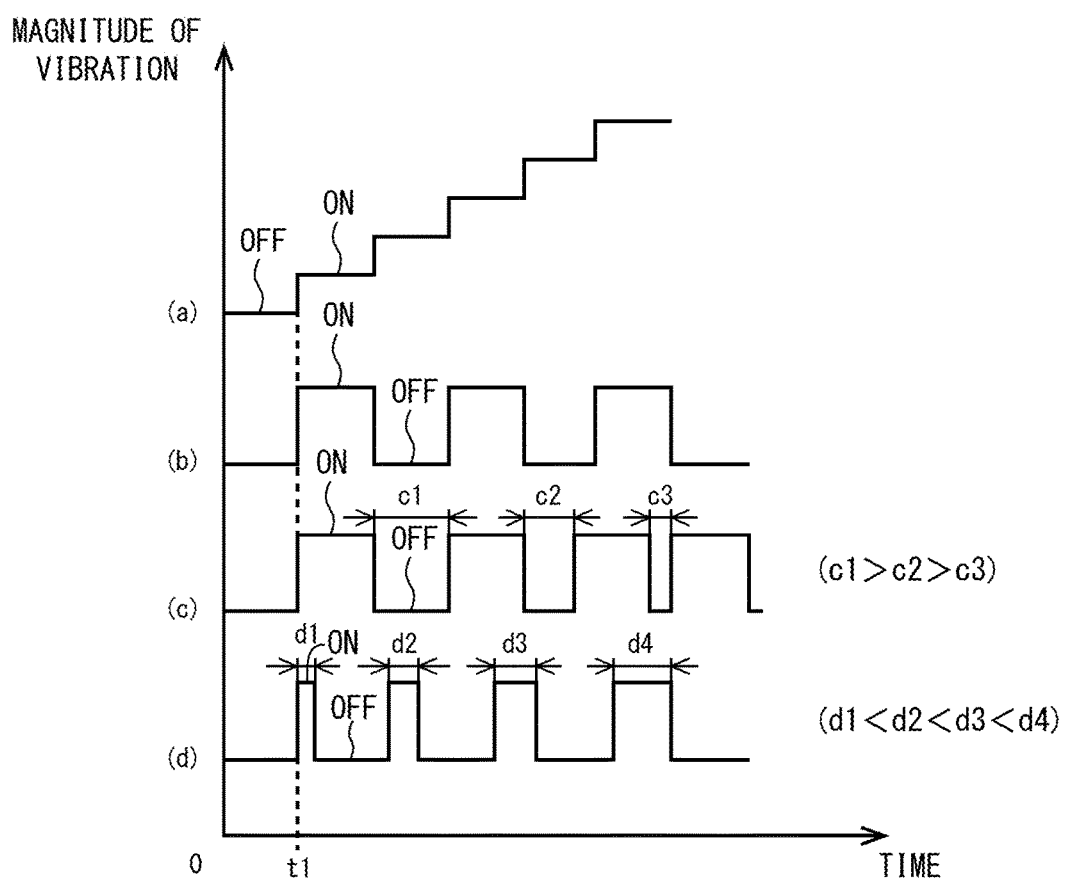
FIG. 9 is a diagram of assistance in explaining an outline of change patterns stored by combustion state changing means.

FIG. 9 is a diagram of assistance in explaining an outline of the change patterns 3 stored by the combustion state changing means 2. The remaining amount warning control performed by the combustion state changing means 2 can be not only performed by continuing to generate a uniform vibration from a start of the control but also performed according to various change patterns that change magnitude and cycles. This diagram shows an outline of four change patterns (a) to (d) from an upper side.

a) increases the magnitude of vibration at intervals of a predetermined time from a start of the control at time t1. According to such a change pattern, the magnitude of vibration is gradually increased with the passage of time. Thus, an effect of prompting the occupant to perform refueling is enhanced.

(b) repeatedly turns on and off vibration in fixed cycles from a start of the control at time t1. According to such a change pattern, the occupant can be made to recognize that vibrations occurring in the engine and the vehicle body are produced by intentional control due to a decrease in the remaining fuel amount rather than a mechanical trouble or the like.

(c) gradually shortens a time during which vibration is off (c1>c2>c3), while repeatedly turning on the vibration and turning off the vibration. (d) gradually lengthens a time during which vibration is on (d1<d2<d3<d4), while repeatedly turning on the vibration and turning off the vibration. According to these change patterns, the occupant can be made to recognize that a need for refueling is increasing with the passage of time from the time of the start of the control.

The change patterns described above can not only be each applied singly but also be applied by various methods, such as applying different change patterns at a time of a start of the control and at a time of resumption in the snooze control.

In addition, the change patterns (a), (c), and (d) shown in FIG. 9 change the magnitude of vibration, cycles of occurrence of vibration, and the like with the passage of time. However, the magnitude of vibration, cycles of occurrence of vibration, and the like can be changed not only with the passage of time but also according to the remaining fuel amount, an amount of fuel consumption, a traveled distance, or the like, which occurs as the vehicle travels.

Further, the change patterns as described above may be formed by applying any of the injector 10, the ignition device 11, and the intake air amount limiting means 12, and appropriate vibrations may be generated by combining two or more means of these means.

Figure 10:
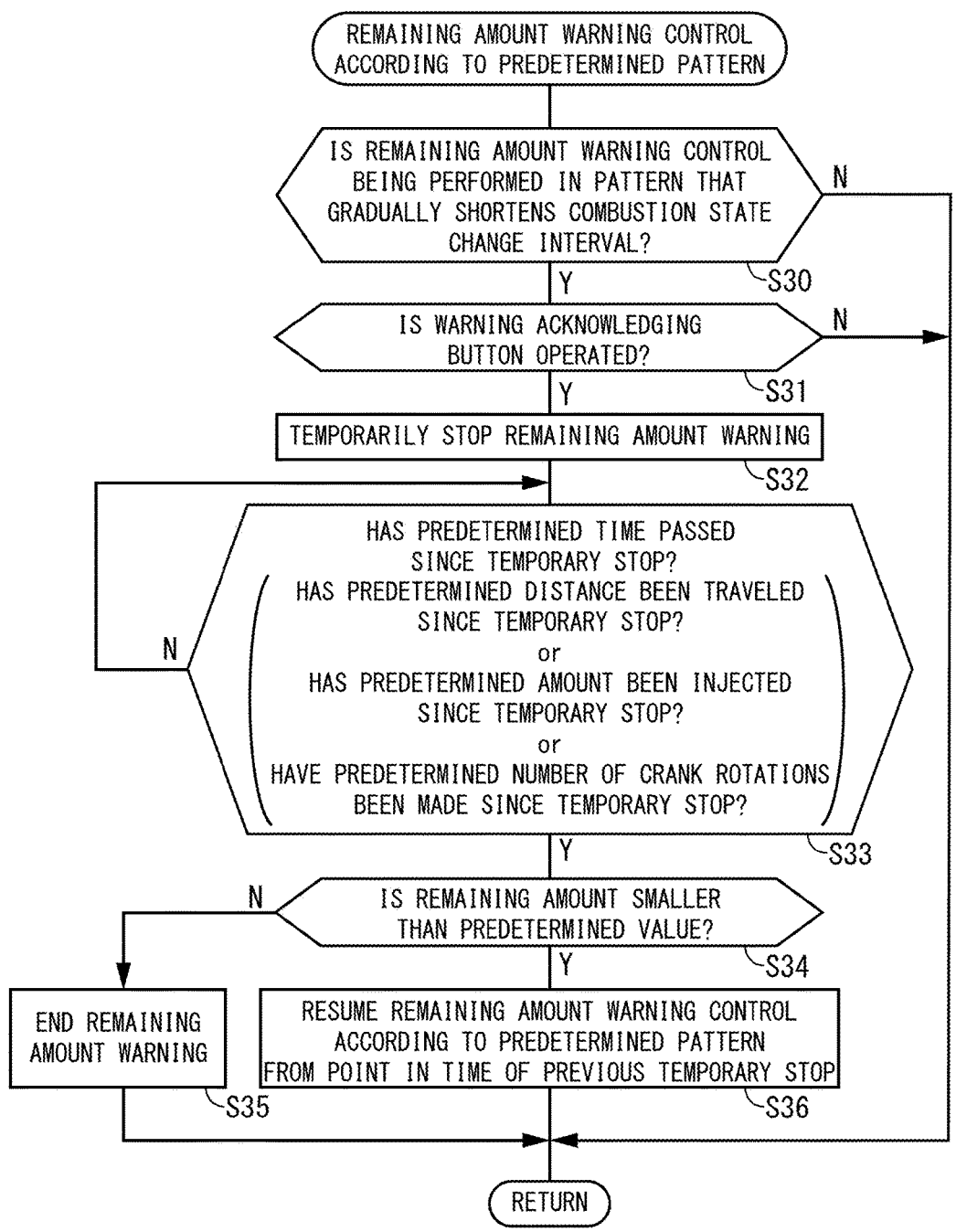
FIG. 10 is a flowchart showing a procedure for the remaining amount warning control according to a predetermined change pattern.

FIG. 10 is a flowchart showing a procedure for the remaining amount warning control according to a predetermined change pattern. This flowchart corresponds to a procedure in which the warning acknowledging button 5 is operated while the remaining amount warning control is performed using the change pattern (c) shown in FIG. 9, and, when the remaining amount warning control is resumed after the passage of a predetermined time, the remaining amount warning control is resumed from a control state at a point in time that the warning acknowledging button 5 is operated.

In step S30, whether or not the remaining amount warning control is being performed in the change pattern that gradually shortens a combustion state change interval is determined. When an affirmative determination is made in step S30, whether or not the warning acknowledging button 5 is operated is determined in step S31. When an affirmative determination is made in step S31, a remaining amount warning is temporarily stopped in step S32. At this time, the control unit 1 stores, in the memory 4, a performance history indicating an elapsed time from a start of the remaining amount warning control and an amount by which the combustion state change interval is shortened as compared with the combustion state change interval at the time of the start of the control.

In step S33, whether or not a predetermined time has passed since the temporary stop is determined. When an affirmative determination is made in step S33, the processing proceeds to step S34. Whether or not the remaining fuel amount is smaller than the predetermined value is determined in step S34. Then, when an affirmative determination is made in step S34, the remaining amount warning control is resumed according to the predetermined pattern from the point in time of the previous temporary stop on the basis of the performance history stored in the memory 4. Incidentally, as shown in the figure, the determination in step S33 may be made by determining: whether or not the vehicle has traveled a predetermined distance since the point in time of the temporary stop; whether or not a predetermined amount of fuel has been injected since the point in time of the temporary stop; or whether or not the crankshaft of the engine has made a predetermined number of rotations since the point in time of the temporary stop.

When a negative determination is made in step S30 or S31, the control sequence is directly ended. In addition, when a negative determination is made in step S33, the processing returns to the determination in step S33. When a negative determination is made in step S34, the remaining amount warning control is ended in step S35. The control sequence is then ended.

Incidentally, the memory 4 is formed by a nonvolatile memory, and can therefore store the performance history even after the engine E is stopped and the power to the vehicle is turned off. Accordingly, it is also possible to resume, at a time of a restart of the engine, the remaining amount warning control performed at a point in time of a previous stop of the engine.

In addition, the flowchart described above illustrates an example in which the remaining amount warning control is temporarily stopped arbitrarily by operating the warning acknowledging button during the remaining amount warning control. However, this temporary stop can also be set to be made automatically by being triggered by the passage of a fixed time (for example one minute) since a start of the remaining amount warning control, which fixed time is sufficient for the occupant to recognize the remaining amount warning control.

Figure 11:
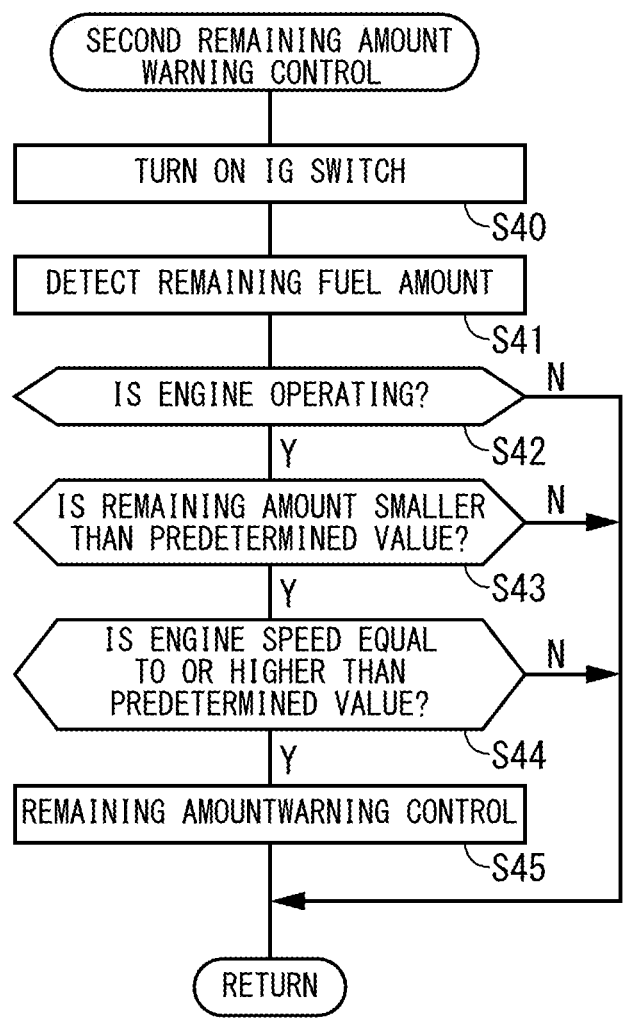
FIG. 11 is a flowchart showing a procedure for second remaining amount warning control.

FIG. 11 is a flowchart showing a procedure for second remaining amount warning control. This flowchart is characterized in that an additional condition that the engine speed be equal to or higher than a predetermined value is set in addition to the condition that the remaining fuel amount be smaller than the predetermined value.

When the IG switch for turning on and off the power to the vehicle is turned on in step S40, a remaining fuel amount is detected on the basis of the output of the fuel gauge 6 in step S41.

In next step S42, whether or not the engine E is operating is determined. When an affirmative determination is made in step S42, the processing proceeds to step S43. Whether or not the remaining fuel amount is smaller than the predetermined value is determined in step S43. When an affirmative is obtained in step S43, the processing proceeds to step S44, where whether or not the engine speed is equal to or higher than a predetermined value (for example 2000 rpm) is determined.

When an affirmative determination is made in step S44, that is, when it is determined that the remaining fuel amount is smaller than the predetermined value and that the engine speed is equal to or higher than the predetermined value, the remaining amount warning control is performed in step S45.

According to the above-described control mode, it is possible to avoid engine stalling during idling operation, and refrain from performing the remaining amount warning control during a period during which the occupant recognizes a decreased state of the remaining fuel amount and is driving while maintaining a low rotational speed.

On the other hand, it is possible to set an additional condition that the vehicle speed detected by the vehicle speed sensor be equal to or higher than a predetermined value (for example 10 km/h). According to this setting, it is possible to refrain from performing the remaining amount warning control when the vehicle is stopped or the occupant is walking while pushing the vehicle.

As described above, according to the remaining fuel amount warning device for a motorcycle in accordance with the present invention, when the remaining fuel amount detected by the fuel gauge 6 becomes smaller than the predetermined value, the remaining fuel amount warning device performs the remaining amount warning control that produces vibration different than during the normal operation by changing the combustion state of the engine E by the combustion state changing means 2 included in the ECU 1. The occupant can therefore be made to recognize intuitively through a tactile sense that the remaining fuel amount is decreasing. It is thereby possible to warn of a decrease in the remaining fuel amount effectively even while the vehicle is traveling, without adding a dedicated device for warning of the decrease in the remaining fuel amount.

It is to be noted that the structure and form of the engine, the structures of the injector, the ignition device, and the intake air amount limiting means or the numbers of injectors, ignition devices, and intake air amount limiting means, the modes of the change patterns of the remaining amount warning control, combinations of the injector, the ignition device, and the intake air amount limiting means constituting the remaining amount warning control, and the like are not limited to the foregoing embodiment, but are susceptible of various changes. The remaining fuel amount warning device for a vehicle according to the present invention is applicable to not only motorcycles but also various kinds of vehicles such as saddle riding type three-wheeled and four-wheeled vehicles.

REFERENCE SIGNS LIST

1 . . . Control unit (ECU),
2 . . . Combustion state changing means,
4 . . . Memory,
3 . . . Change pattern,
5 . . . Warning acknowledging button (warning acknowledging means),
6 . . . Fuel gauge,
7 . . . Odometer,
8 . . . Tachometer,
9 . . . Timer,
10 . . . Injector,
11 . . . Ignition device,
12 . . . Intake air amount limiting means,
13 . . . Fuel tank,
E . . . Engine

The invention claimed is:

1. A remaining fuel amount warning device for a motorcycle, the remaining fuel amount warning device giving a warning that an amount of fuel remaining in a fuel tank is smaller than a predetermined value on a basis of output of a fuel gauge measuring the remaining fuel amount, the remaining fuel amount warning device comprising:
   combustion state changing means for changing a combustion state of an engine;
   wherein when the remaining fuel amount becomes smaller than the predetermined value, the remaining fuel amount warning device performing remaining amount warning control that produces a first vibration by changing the combustion state of the engine by the combustion state changing means, the first vibration being different than a normal operation vibration, the normal operation vibration being produced during normal operation;
   wherein the combustion state changing means is configured to also perform vehicle speed limiting control by changing the combustion state of the engine to produce a second vibration different than the first vibration and the normal operation vibration;
   wherein the remaining fuel amount warning device further comprises warning acknowledging means for stopping the remaining amount warning control for a predetermined time on a basis of an operation by an occupant;
   wherein an operating switch for operating another device provided to the vehicle is made to serve also as the warning acknowledging means;
   wherein the operating switch is a starter switch for starting the engine; and
   wherein the combustion state changing means performs the remaining fuel amount warning control and the vehicle speed limiting control by a same mechanism for changing the combustion state of the engine.

2. The remaining fuel amount warning device for a motorcycle according to claim 1, wherein
   the remaining amount warning control is periodically performed at each predetermined interval.

3. The remaining fuel amount warning device for a motorcycle according to claim 2, wherein
   the remaining amount warning control is set to change the predetermined interval according to a change in the remaining fuel amount, an amount of fuel consumption, a traveled distance, or an elapsed time, the change occurring as the vehicle travels.

4. The remaining fuel amount warning device for a motorcycle according to claim 2, wherein
   the remaining amount warning control is set to change magnitude of the first vibration according to a change in the remaining fuel amount, an amount of fuel consumption, a traveled distance, or an elapsed time, the change occurring as the vehicle travels.

5. The remaining fuel amount warning device for a motorcycle according to claim 1, wherein
the mechanism for performing the remaining amount warning control is changing an amount of fuel injection by an injector that supplies the fuel to the engine.

6. The remaining fuel amount warning device for a motorcycle according to claim 5, wherein
the fuel injection amount is changed by injection thinning out, the injection thinning out limiting a predetermined number of consecutive times of injection in injection timings occurring in one cycle, and
the predetermined number of consecutive times is increased according to a number of cylinders of the engine.

7. The remaining fuel amount warning device for a motorcycle according to claim 6, wherein
the predetermined number of consecutive times is equal to or higher than half the number of cylinders of the engine.

8. The remaining fuel amount warning device for a motorcycle according to claim 1, wherein
the mechanism for performing the remaining amount warning control is changing a driving mode of an ignition device of the engine.

9. The remaining fuel amount warning device for a motorcycle according to claim 1, wherein
the mechanism for performing the remaining amount warning control is limiting an amount of intake air to the engine.

10. The remaining fuel amount warning device for a motorcycle according to claim 1, wherein
the remaining amount warning control is not performed in a state in which rotational speed of the engine is less than a predetermined value.

11. The remaining fuel amount warning device for a motorcycle according to claim 1, wherein
the remaining amount warning control is not performed in a state in which vehicle speed is less than a predetermined value.

12. The remaining fuel amount warning device for a motorcycle according to claim 1, further comprising a memory configured to retain a performance history of the remaining amount warning control also after a stop of the engine,
wherein when there is no increase in the remaining fuel amount at a time of a restart of the engine, the remaining amount warning control is resumed from a time of the stop of the engine on a basis of the performance history.

13. A remaining fuel amount warning device for a motorcycle, the remaining fuel amount warning device giving a warning that an amount of fuel remaining in a fuel tank is smaller than a predetermined value on a basis of output of a fuel gauge measuring the remaining fuel amount, the remaining fuel amount warning device comprising:
combustion state changing means for changing a combustion state of an engine;
wherein when the remaining fuel amount becomes smaller than the predetermined value, the remaining fuel amount warning device performing remaining amount warning control that produces a first vibration by changing the combustion state of the engine by the combustion state changing means, the first vibration being different than a normal operation vibration, the normal operation vibration being produced during normal operation;
wherein the combustion state changing means is configured to also perform vehicle speed limiting control by changing the combustion state of the engine to produce a second vibration different than the first vibration and the normal operation vibration;
wherein the remaining fuel amount warning device further comprises warning acknowledging means for stopping the remaining amount warning control for a predetermined time on a basis of an operation by an occupant;
wherein an operating switch for operating another device provided to the vehicle is made to serve also as the warning acknowledging means;
wherein the operating switch is a cancellation switch for stopping perform of a winker; and
wherein the combustion state changing means performs the remaining fuel amount warning control and the vehicle speed limiting control by a same mechanism for changing the combustion state of the engine.

14. The remaining fuel amount warning device for a motorcycle according to claim 13, wherein
the remaining amount warning control is periodically performed at each predetermined interval.

15. The remaining fuel amount warning device for a motorcycle according to claim 14, wherein
the remaining amount warning control is set to change the predetermined interval according to a change in the remaining fuel amount, an amount of fuel consumption, a traveled distance, or an elapsed time, the change occurring as the vehicle travels.

16. The remaining fuel amount warning device for a motorcycle according to claim 14, wherein
the remaining amount warning control is set to change magnitude of the first vibration according to a change in the remaining fuel amount, an amount of fuel consumption, a traveled distance, or an elapsed time, the change occurring as the vehicle travels.

17. The remaining fuel amount warning device for a motorcycle according to claim 13, wherein
the mechanism for performing the remaining amount warning control is changing an amount of fuel injection by an injector that supplies the fuel to the engine.

18. The remaining fuel amount warning device for a motorcycle according to claim 17, wherein
the fuel injection amount is changed by injection thinning out, the injection thinning out limiting a predetermined number of consecutive times of injection in injection timings occurring in one cycle, and
the predetermined number of consecutive times is increased according to a number of cylinders of the engine.

19. The remaining fuel amount warning device for a motorcycle according to claim 18, wherein
the predetermined number of consecutive times is equal to or higher than half the number of cylinders of the engine.

20. The remaining fuel amount warning device for a motorcycle according to claim 13, wherein
the mechanism for performing the remaining amount warning control is changing a driving mode of an ignition device of the engine.

21. The remaining fuel amount warning device for a motorcycle according to claim 13, wherein
the mechanism for performing the remaining amount warning control is limiting an amount of intake air to the engine.

22. The remaining fuel amount warning device for a motorcycle according to claim 13, wherein
the remaining amount warning control is not performed in a state in which rotational speed of the engine is less than a predetermined value.

23. The remaining fuel amount warning device for a motorcycle according to claim 13, wherein
the remaining amount warning control is not performed in a state in which vehicle speed is less than a predetermined value.

24. The remaining fuel amount warning device for a motorcycle according to claim 13, further comprising a memory configured to retain a performance history of the remaining amount warning control also after a stop of the engine,
wherein when there is no increase in the remaining fuel amount at a time of a restart of the engine, the remaining amount warning control is resumed from a time of the stop of the engine on a basis of the performance history.

* * * * *